(12) United States Patent
Hoshino et al.

(10) Patent No.: US 7,979,800 B2
(45) Date of Patent: Jul. 12, 2011

(54) CONTENTS INFORMATION DISPLAY DEVICE

(75) Inventors: Takeshi Hoshino, Kodaira (JP); Junichiro Watanabe, Tokyo (JP); Takaaki Ishii, Kawasaki (JP); Isshu Nakajima, Fuchu (JP); Paolantonio Sergio, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 180 days.

(21) Appl. No.: 11/389,045

(22) Filed: Mar. 27, 2006

(65) Prior Publication Data

US 2006/0228096 A1 Oct. 12, 2006

(30) Foreign Application Priority Data

Mar. 29, 2005 (JP) ................................. 2005-094217

(51) Int. Cl.
*G06F 3/00* (2006.01)
*H04N 5/76* (2006.01)
(52) U.S. Cl. ........................................ 715/719; 386/297
(58) Field of Classification Search .................. 715/719; 386/297
See application file for complete search history.

(56) References Cited

U.S. PATENT DOCUMENTS

| 5,404,316 | A  | * | 4/1995  | Klingler et al. ............... 715/723 |
| 5,706,097 | A  | * | 1/1998  | Schelling et al. ............. 358/296 |
| 6,122,011 | A  | * | 9/2000  | Dias et al. ...................... 348/569 |
| 6,725,215 | B2 | * | 4/2004  | Yamamoto ........................ 707/3 |
| 6,753,928 | B1 | * | 6/2004  | Gospel et al. ................. 348/569 |
| 6,756,997 | B1 | * | 6/2004  | Ward et al. ..................... 715/716 |
| 6,772,433 | B1 | * | 8/2004  | LaJoie et al. ..................... 725/52 |
| 6,807,306 | B1 | * | 10/2004 | Girgensohn et al. .......... 382/225 |
| 6,836,293 | B2 | * | 12/2004 | Itoh et al. ....................... 348/452 |
| 7,051,354 | B2 | * | 5/2006  | Mears .............................. 725/41 |
| 7,383,508 | B2 | * | 6/2008  | Toyama et al. ................ 715/723 |
| 2001/0016108 | A1 | * | 8/2001 | Itoh et al. ......................... 386/46 |
| 2002/0135608 | A1 | * | 9/2002 | Hamada et al. ................ 345/723 |
| 2003/0086691 | A1 | * | 5/2003 | Yu .................................... 386/69 |
| 2003/0112354 | A1 | * | 6/2003 | Ortiz et al. ............... 348/333.01 |
| 2004/0021651 | A1 | * | 2/2004 | Takeuchi ....................... 345/204 |
| 2004/0255325 | A1 | * | 12/2004 | Furui et al. ...................... 725/61 |
| 2005/0046699 | A1 | * | 3/2005 | Oya et al. .................... 348/207.1 |
| 2005/0157599 | A1 | * | 7/2005 | Kiyama et al. ............. 369/30.03 |
| 2006/0001771 | A1 | * | 1/2006 | Hayakawa ..................... 348/553 |
| 2006/0007069 | A1 | * | 1/2006 | Isono et al. ................... 345/75.1 |
| 2007/0118872 | A1 | * | 5/2007 | Song et al. ..................... 725/135 |

FOREIGN PATENT DOCUMENTS

| EP | 1538829 A1 | * | 6/2005 |
| JP | 9-139913 A |   | 5/1997 |
| JP | 2005-006042 |   | 6/2001 |
| JP | 2001-257968 A |   | 9/2001 |
| JP | 2001-326867 |   | 11/2001 |
| JP | 2003-189205 A |   | 7/2003 |

* cited by examiner

*Primary Examiner* — William L Bashore
*Assistant Examiner* — David Phantana-angkool
(74) *Attorney, Agent, or Firm* — Mattingly & Malur, PC

(57) ABSTRACT

Desired contents information can be easily extracted in a contents information display device. The contents information display device includes: an information receiving part that receives contents information; a recording part that records received contents information; a display part that displays the contents information; an input part that inputs an operation signal; and a control part that totally controls these parts. The control part performs control to display the contents information around a selected time on the display part in a way that it can be selected as contents images arranged in a time sequence at a predetermined time interval.

15 Claims, 12 Drawing Sheets

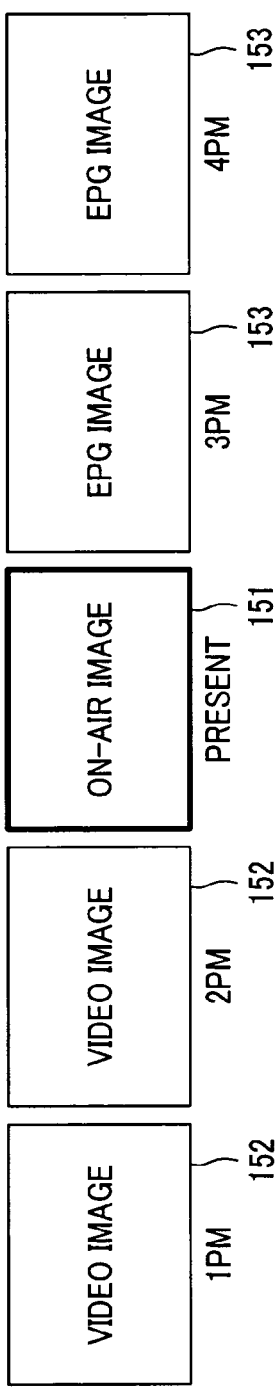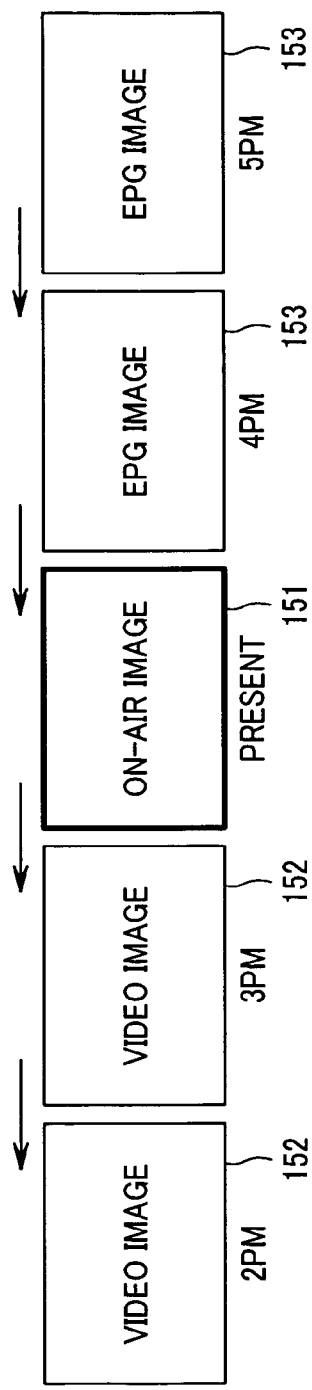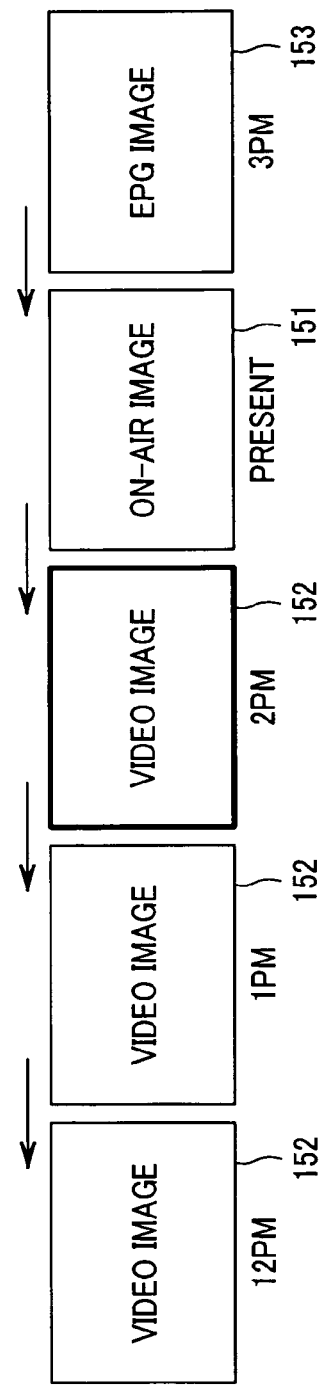

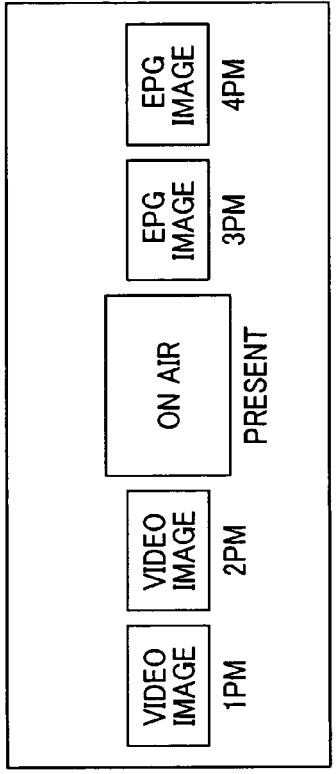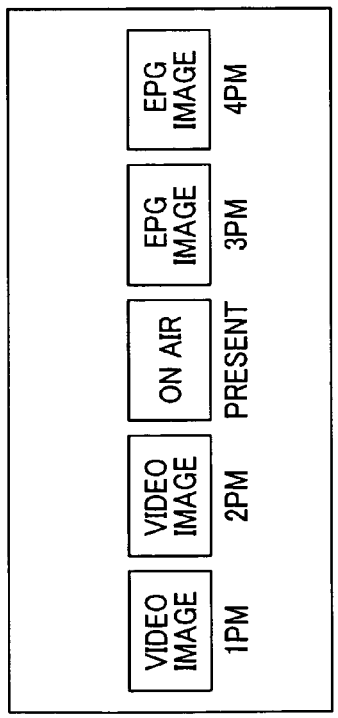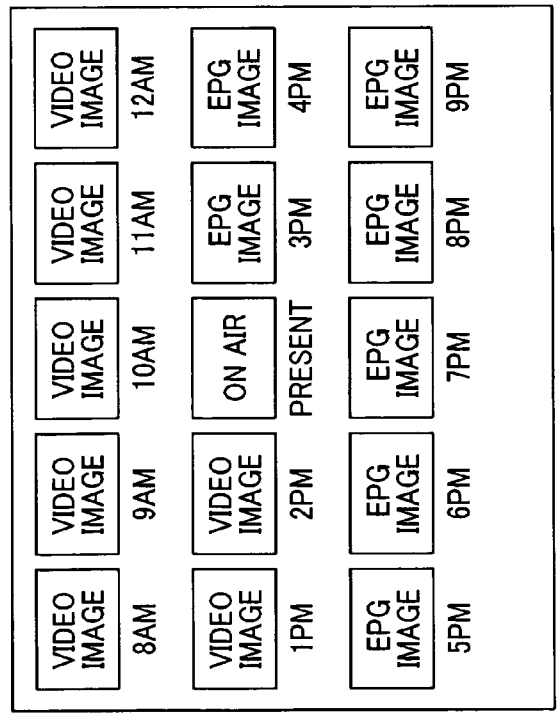

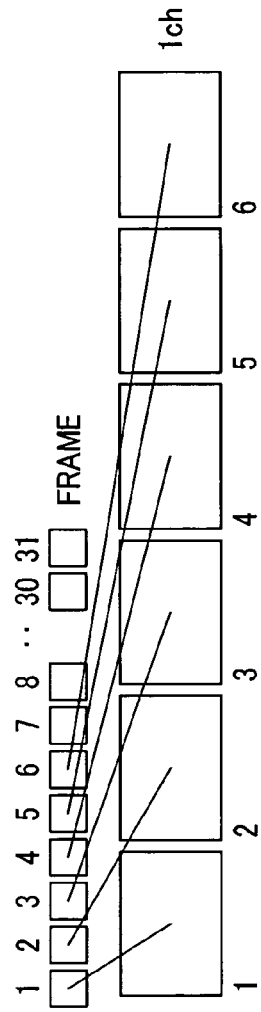
FIG.8A
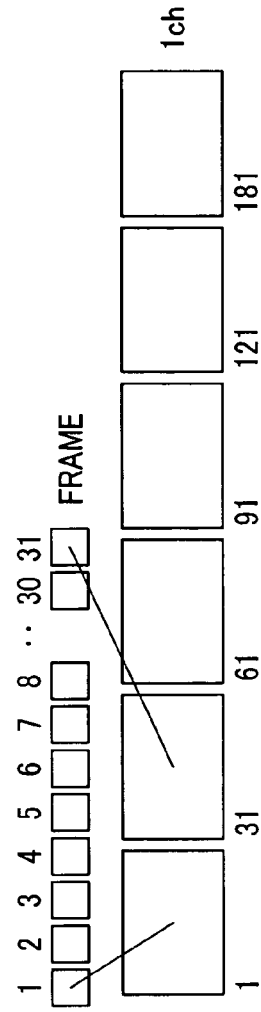
FIG.8B
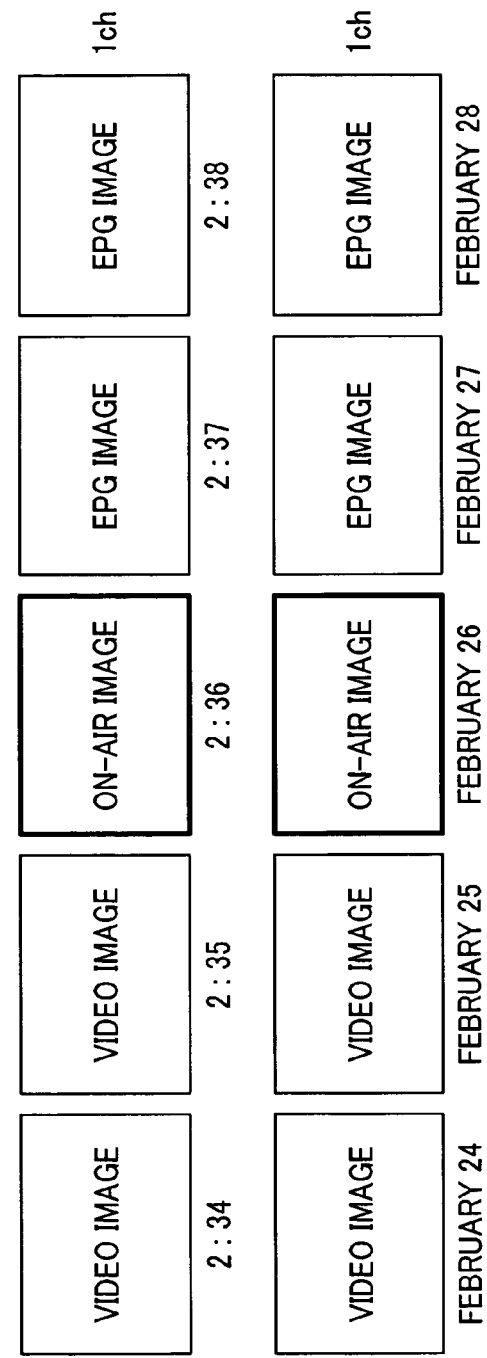
FIG.8C
FIG.8D

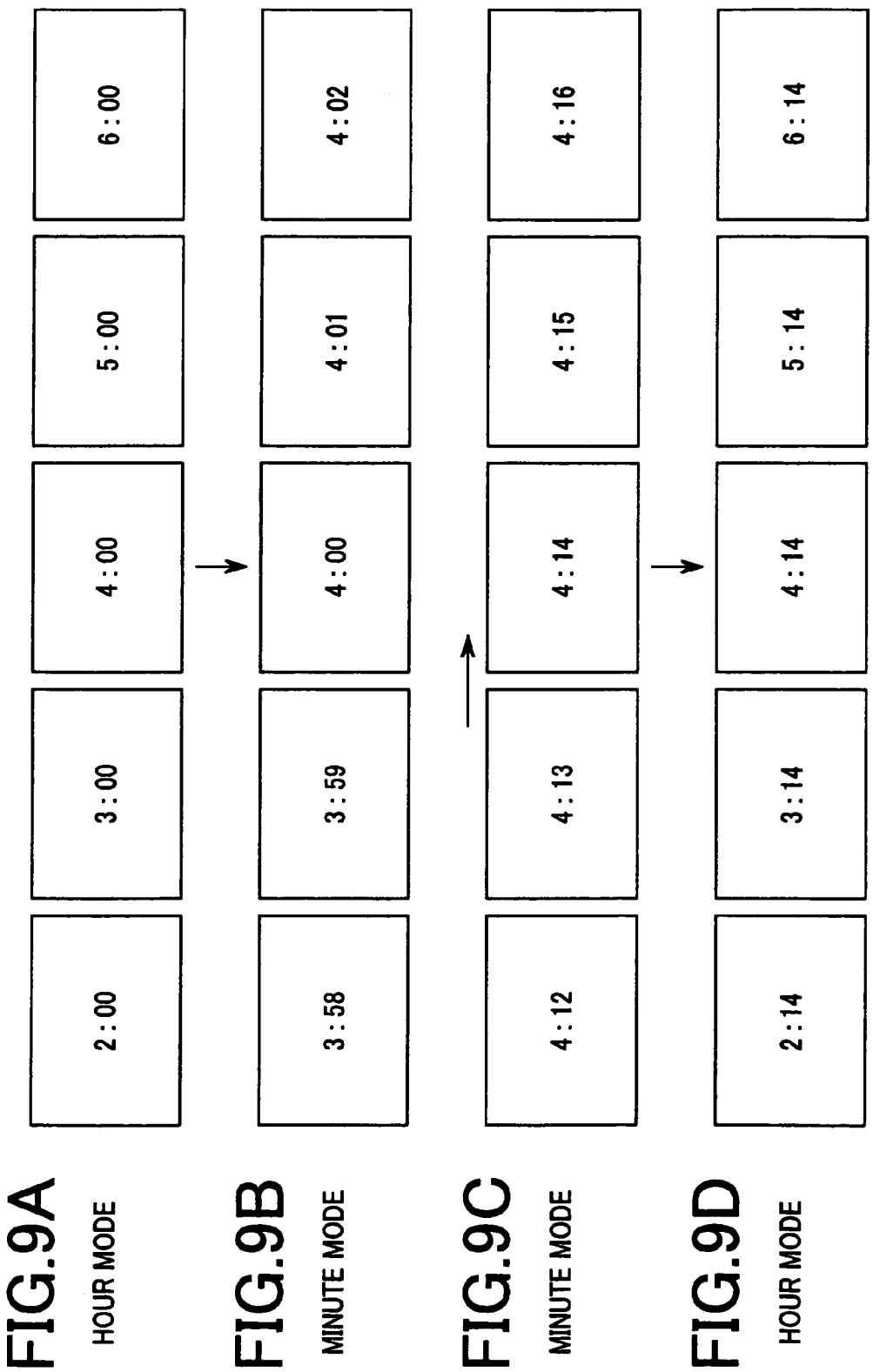

FIG.11A

|  | 1ch | 2ch | 3ch | 4ch |
|---|---|---|---|---|
| 17:00 | | | | |
| 16:00 | | | | |
| 15:00 | | | | |
| 14:00 | | | | |
| 13:00 | | | | |
| 12:00 | | | | |
| 11:00 | | | | |

FIG.11B

|  | DOCUMENTARY | DRAMA | NEWS | SPORTS |
|---|---|---|---|---|
| 17:00 | | | | |
| 16:00 | | | | |
| 15:00 | | | | |
| 14:00 | | | | |
| 13:00 | | | | |
| 12:00 | | | | |
| 11:00 | | | | |

CONTENTS INFORMATION DISPLAY DEVICE

CLAIM OF PRIORITY

The present application claims priority from Japanese application JP 2005-094217 filed on Mar. 29, 2005, the content of which is hereby incorporated by reference into this application.

FIELD OF THE INVENTION

The present invention relates to a contents information display device, and more particularly to a contents information display device that can easily extract desired contents information from contents information.

With the recent widespread use of broadcasting satellites, communications satellites, and cable TVs, digital broadcasting services that can receive digitalized image information, electronic program guide information, and the like have come into wide use. Furthermore, the recent development of video recording technology has enabled the recording of high volumes of video information in a HDD (hard disk drive) and DVD (digital video disk drive). The large capacity of these recording apparatuses makes it difficult to extract specified contents information from recorded contents information.

Accordingly, according to a conventional technique as described in Japanese Unexamined Patent Publication No. 2005-6042 (patent document 1), a contents display area in which contents are displayed in a list form, and first and second search areas in which search items in upper layers of the contents are displayed are displayed on one screen. Further, in the first and second search areas, the display of a search area of a lower layer is changed according to options selected by operating the respective scroll keys, and in the contents display area, a plurality of contents are selected by operating the scroll keys and shifted to a next decision operation by operating a decide key.

[Patent document 1] Japanese Unexamined Patent Publication No. 2005-6042

However, with the conventional technique, the selection of search items of a hierarchical structure has involved troublesome operations.

An object of the present invention is to provide a contents information display device that can easily extract desired contents information.

SUMMARY OF THE INVENTION

A first aspect of the present invention for achieving the above-described object is a contents information display device including: an information receiving part that receives contents information; a recording part that records received contents information; a display part that displays the contents information; an input part that inputs an operation signal; and a control part that totally controls these parts, wherein the control part performs control to display the contents information around a selected time on the display part in a way that it can be selectable as contents images arranged in a time sequence at a predetermined time interval.

Examples of preferable constructions in the first aspect of the present invention are as follows:

(1) The plurality of contents images are predetermined static images, or moving images beginning at a display time of the contents images decided from the selected time and the predetermined time interval.

(2) In a direction orthogonal to the direction in which the plurality of contents images are arranged, a plurality of channels or categories of contents images are displayed in juxtaposition.

(3) A selective image window is further displayed in which contents images selected from the plurality of contents images are displayed, and moving images are displayed within the selective image window.

(4) Within the selective window, a time setting area for setting the predetermined time and a time interval selection area for selecting the time interval are displayed.

(5) Recorded information read from the recording part is displayed as the contents images from a time earlier than the current time, and electronic program guide information is displayed as the contents images from a time later than the current time.

(6) The plurality of contents images are displayed in a way that they move in a time elapse direction of a horizontal axis as time elapses.

(7) A time interval change area for changing the time interval is displayed.

A second aspect of the present invention is a contents information display device including: a plurality of information receiving parts that receive a plurality of types of contents information at the same time; a recording part that records the plurality of types of contents information received at the same time in the plurality of information receiving parts; a display part that displays at the same time the plurality of types of contents information recorded in the recording part on a display screen as contents images; an input part that inputs an operation signal; a control part that totally controls these parts, wherein the control part performs control to display the contents information on the display screen with one of vertical and horizontal axes as a type axis of the contents information and the other as a time axis in a way that the plurality of types of contents information around a time selected based on the operation signal can be selected as a plurality of contents images arranged in a time sequence at a predetermined time interval in the direction of the time axis and on a type basis in the direction of the type axis.

A third aspect of the present invention is a recording/reproducing device including: an information receiving part that receives contents information; a recording part that records received contents information; an input part that inputs an operation signal; and a control part that totally controls these parts, wherein the control part performs output so that the contents information around a selected time is displayed on the display part in a way that it can be selectable as a plurality of contents images arranged in a time sequence at a predetermined time interval.

According to the contents information display device of the present invention, desired contents information can be easily extracted.

BRIEF DESCRIPTION OF THE DRAWINGS

FIGS. 6A, 6B, and 6C are drawings showing display examples of basic operations by the GUI of the present embodiment;

FIGS. 7A, 7B, and 7C are drawings showing variations of display examples by the GUI of the present embodiment;

FIGS. 8A, 8B, 8C, and 8D are drawings for explaining examples of display with different time resolutions by the GUI of the present embodiment;

FIGS. 9A, 9B, 9C, and 9D are drawings for explaining display examples of a dynamic reference mode by the GUI of the present embodiment;

FIGS. 11A and 11B are drawings showing an example of displaying a plurality of channels of contents images in the present embodiment on a display screen in a plurality of rows.

DETAILED DESCRIPTION OF THE PREFERRED EMBODIMENTS

Hereinafter, with reference to FIGS. 1 to 12, a contents information display device according to the present invention will be described in detail.

Figure 1:
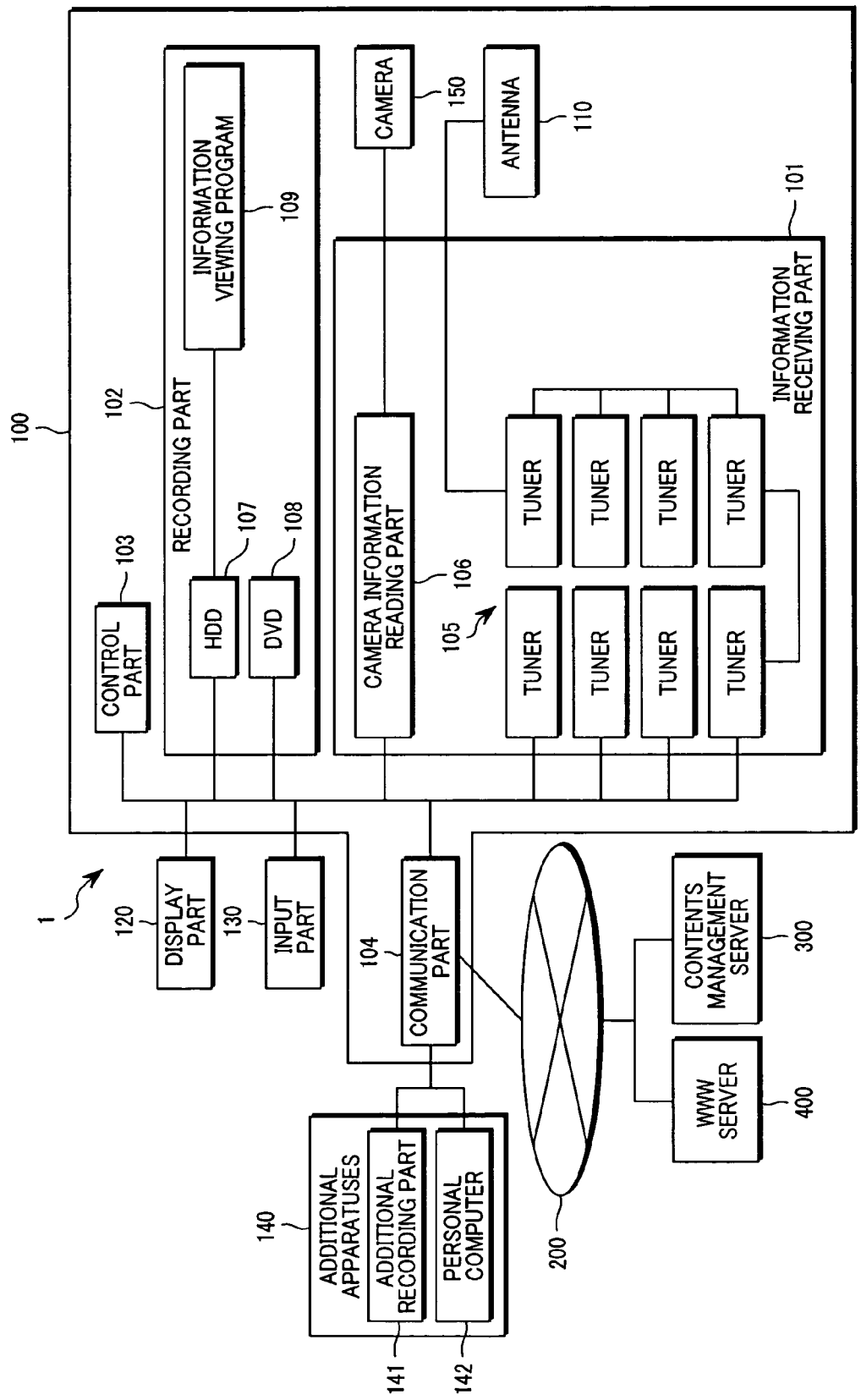
FIG. 1 is a block diagram of a contents information display device according to an embodiment of the present invention.
Figure 2:
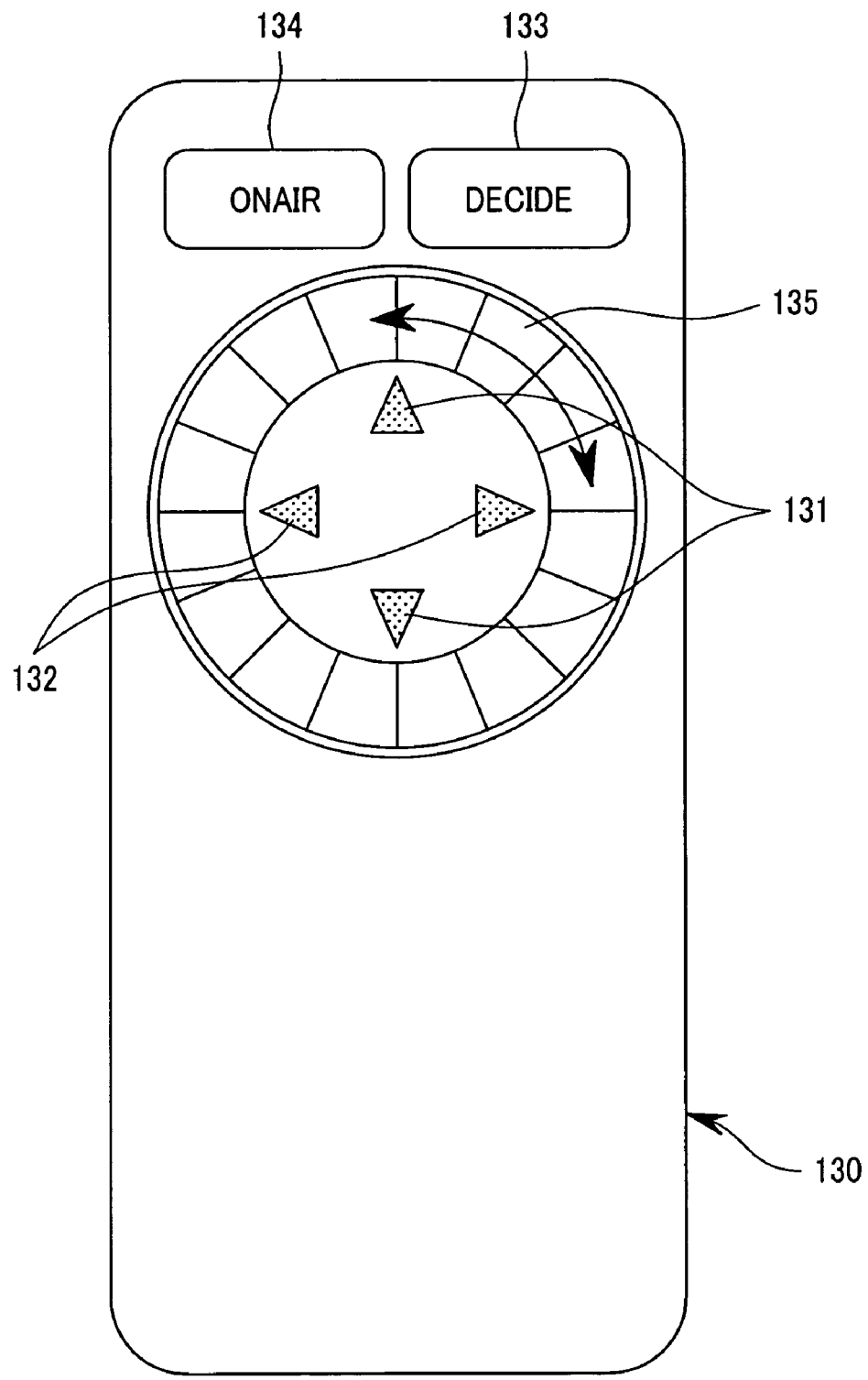
FIG. 2 is a plan view of an input part (remote control) of the contents information display device of FIG. 1.

With reference to FIGS. 1 and 2, the contents information display device 1 will be briefly described. FIG. 1 is a block diagram of the contents information display device 1 according to the present embodiment. FIG. 2 is a plan view of an input part 130 in the operation of the contents information display device 1.

In FIG. 1, a contents information display system includes: a contents information display device 1 that records and reproduces contents information; a contents management server 300 that provides various contents information such as electronic program guide information (EPG information); and a WWW server 400 that provides such contents information as movies and animations. These components are connected through a communication line 200. The communication line 200 is constructed by the Internet, a public line other than the Internet, a leased line, or the like.

The contents information display device 1, which comprises a personal computer, a television receiver, or the like, includes a recording/reproducing device 100 for recording and reproducing contents information, a display part 120 for displaying contents information, an input part 130 for inputting operation signals, and a communication part 104 for communicating with external apparatuses.

The recording/reproducing device 100 includes an information receiving part 101, a recording part 102, a control part 103, and a communication part 104. The recording/reproducing device 100 forms the heart of the contents information display device 1. The information receiving part 101 includes a tuner 105 and a camera information reading part 106. The recording part 102 includes an HDD 107 and a DVD 108. The HDD 107 includes an information browsing program 109.

By connecting a terrestrial antenna 110, a satellite-television antenna, and a cable television to tuners 105, the recording/reproducing device 100 can receive terrestrial broadcasting, satellite broadcasting, and cable television broadcasting, respectively. The recording/reproducing device 100, which has a function compliant with digital broadcasting, receives various contents information such as television image information and EPG information through digital broadcasting, stores them in the recording part 102, and retrieves various information from the contents information. The tuners 105 can receive digital television broadcast waves from a television antenna and convert them into video signals, and perform tuning processing under the control of the control part 103.

The recording/reproducing device 100, connected to the communication line 200 through the communication part 104, can receive, through the communication line 200, various contents information such as EPG information from the contents management server 300 and contents information such as movies from the WWW server 400.

By connecting a monitoring camera 150 to the camera information reading part 106, the recording/reproducing device 100 can receive a video photographed by the monitoring camera 150 as contents information. The plurality of monitoring cameras 150 can be connected to the camera information reading part 106, and the plurality of photographed videos can be received as contents information at the same time.

The recording/reproducing device 100 includes at least a remote control light receiving part for receiving an infrared signal of the input part 130 and a DVD inserting/removing table for inserting and removing a recording medium such as DVD. These are disposed on a housing face. A status display part and various operating switches are disposed on the housing face of the recording/reproducing device 100.

The recording/reproducing device 100 includes USB terminals in the communication part 104, which enable connection with additional apparatuses 140 such as an additional recording part 141 or an additional personal computer 141. By adding an additional recording part 141 and controlling it in the same way as the HDD 107 and the DVD 108, the recording/reproducing device 100 can record and reproduce more types of contents information. Furthermore, by adding an additional personal computer 141 including a recording part and a display part and controlling it in the same way as the HDD 107 and the DVD 108, the recording/reproducing device 100 can record and reproduce more types of contents information, and can use the additional personal computer 141 in place of the display part 120 by controlling it in the same way as the display part 120.

The display part 120, constructed by, for example, a liquid crystal display device or a CRT display device, is connected with the recording/reproducing device 100 through a cord to display contents images generated in the recording/reproducing device 100 on a display screen.

The input part 130, constructed by a remote control in the present embodiment, can totally operate the contents information display device 1 by transmitting operation signals to an infrared light receiving part (not shown) of the recording/reproducing device 100 through infrared signals. The remote control light receiving part may be included in the display part 120 to operate the contents information display device 1 via the display part 120.

The remote control 130 includes as shown in FIG. 2: a pair of vertical movement keys 131 for selecting contents images of a desired channel by vertically moving a cursor; a pair of horizontal movement keys 132 for selecting contents images of a desired time by horizontally moving the cursor; a decide button 133 for deciding a selected state; an on-air button 134 for returning to a display screen on the air; and a time scale change dial 135 for changing the setting of a time interval of contents information displayed in order on the screen. Operating the horizontal movement keys 132 causes a displayed contents image to be horizontally moved without changing the position of the cursor in the display screen. Turning the time scale change dial 135 clockwise shortens a time interval, and turning it counterclockwise extends a time interval. The time scale change dial 135 can set a frame mode, a second mode, a minute mode, an hour mode, and a date mode, and further can set any time between the different modes.

Figure 3:
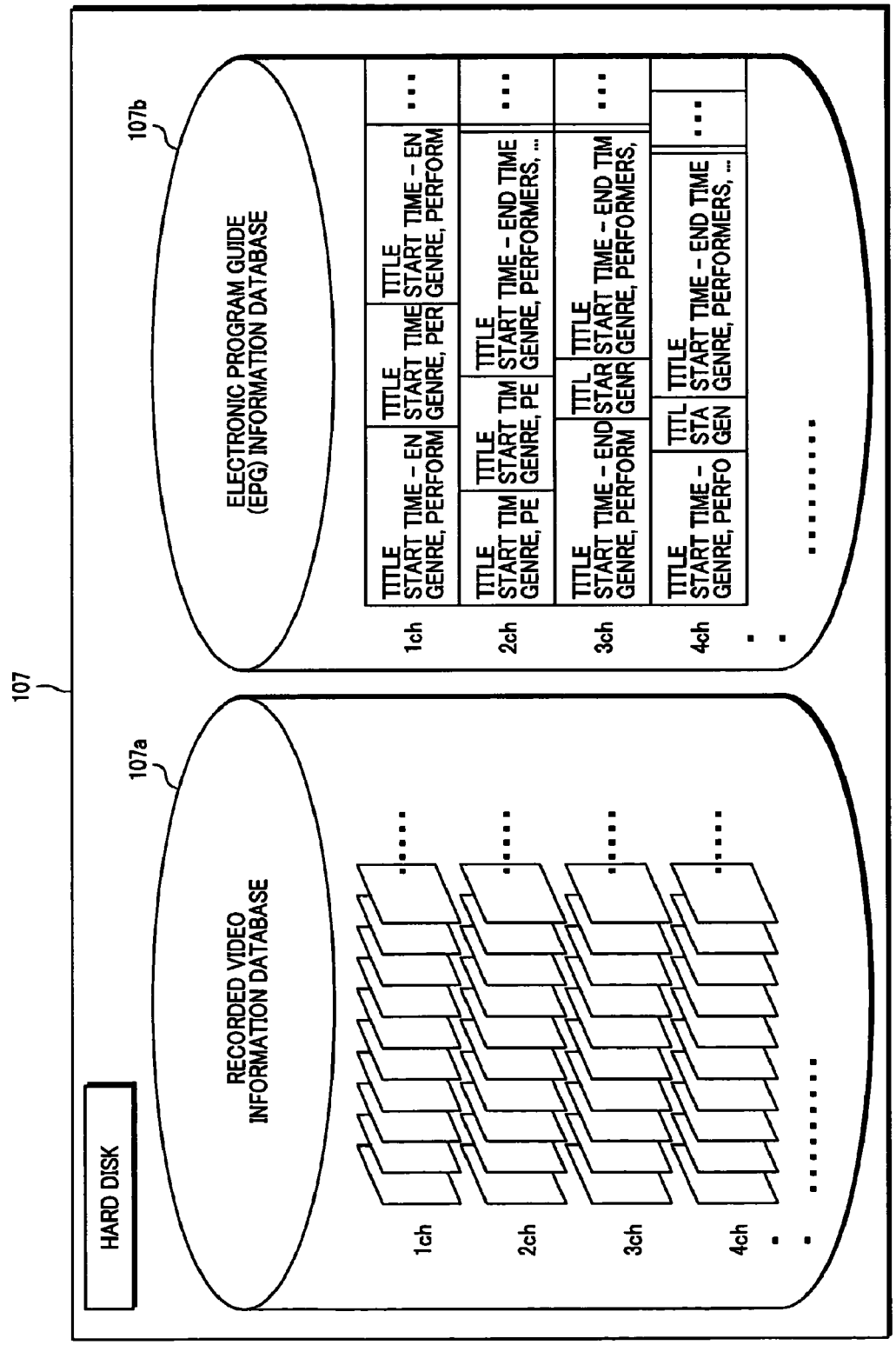
FIG. 3 is a conceptual diagram of a database of an HDD in the contents information display device of FIG. 1.

With reference to FIGS. 1 and 3, the following describes a concrete configuration of the contents information display device 1. FIG. 3 is a conceptual diagram of a database of the HDD 107 of the present embodiment.

In the present embodiment, the remote control light receiving part receives an infrared operation command signal from the input part 130 and inputs the operation command signal to the control part 103. According to the operation command signal, the control part 103 totally controls the contents information display device 1. The control part 103, constructed by a microcomputer, has a clock function to count the current time.

The tuners 105 are those that are known which can receive broadcast waves with EPG information overlapped. The EPG information includes program IDs, program tables, and the like for extracting desired programs from a stream of multiple pieces of program information each including a channel number, program broadcasting time (start time to end time), a program name (title), program contents (genre), and performers. The broadcast waves may be any of terrestrial waves, satellite broadcast waves, and cable broadcast waves.

In the present embodiment, the tuners 105 comprise a plurality of (eight in the example) tuners, and a plurality of broadcast waves are received at the same time by the plurality of tuners 105 to store a plurality of types of contents information in the recording part 102. The HDD 107 and the DVD 108 are provided as the large-capacity recording part 102. Contents information received through broadcast waves can be stored in the DVD 108 and the HDD 107, and contents information stored in the HDD 107 and the DVD 108 can be reproduced.

A broadcast wave received in each of the tuners 105 is separated to video information and EPG information by a program information extraction part (not shown), and are stored in the HDD 107 and the DVD 108 of the recording part 102. As contents information stored in the HDD 107, as shown in FIG. 3, video information is stored in a recorded video information database 107a, and EPG information is stored in an EPG information database 107b. Storage of contents information in the DVD 108 is performed in the same way as that of the HDD 107 described previously. Therefore, a description thereof is omitted.

The recording/reproducing device 100 performs various types of searches based on search information, storage time, and EPG information, and can display, based on results of the searches, contents information stored in the DVD 108 or the HDD 107 on the display part 120 as contents images.

On the other hand, a video received by the camera information reading part 106 is stored in the recording part 102 as contents information in the same way as a broadcast wave, and is handled in the same way as the above-described contents information.

With reference to FIGS. 4 to 12, the following describes a method of displaying contents information in the display part 120 in a way that it can be selected as a plurality of contents images arranged in a time sequence at a predetermined time interval which is a characteristic of the present embodiment.

Figure 4:
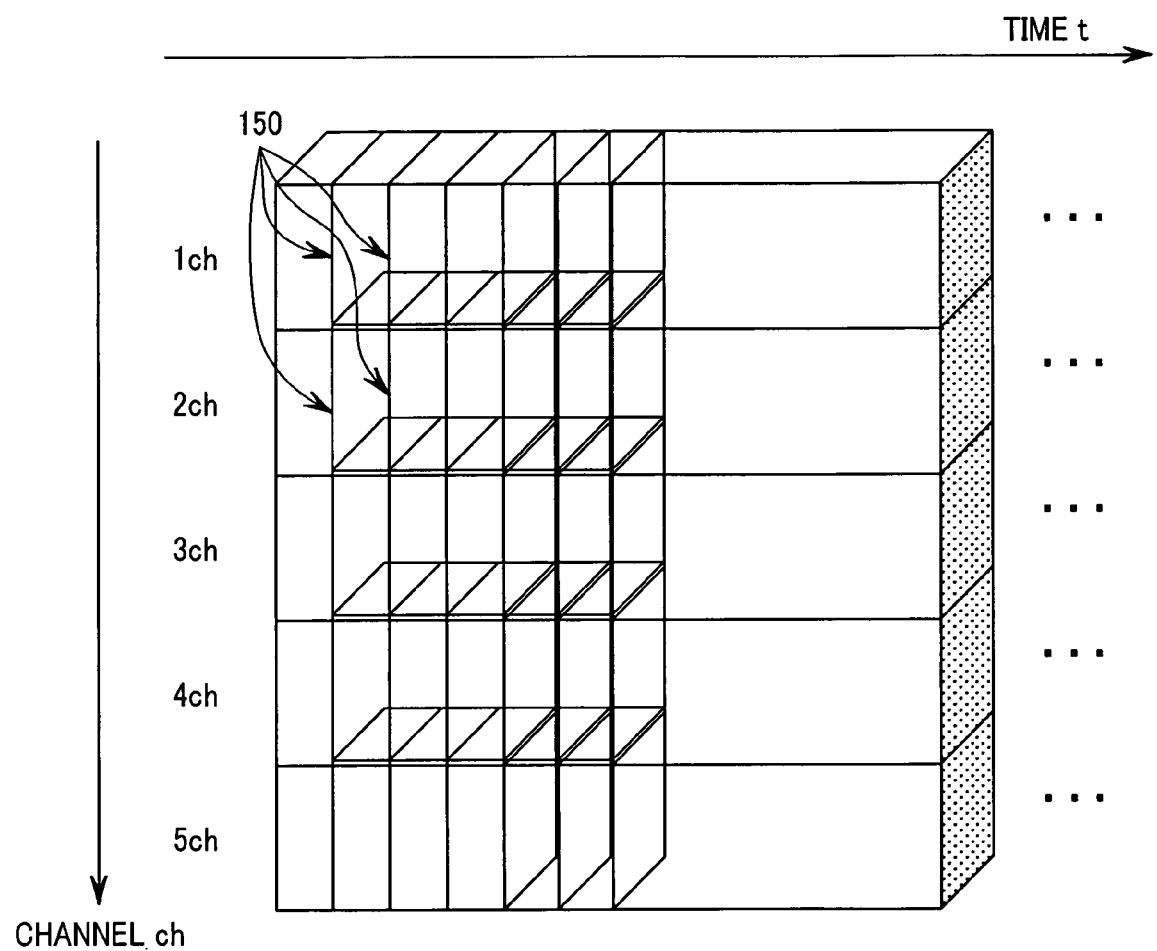
FIG. 4 is a conceptual diagram for explaining the segmentation of a screen display form (GUI) for extracting contents information in the present embodiment.

FIG. 4 is a conceptual diagram for explaining the segmentation of a screen display form (graphical user interface: GUI) for extracting contents information in the present embodiment. In the GUI of the present embodiment, under the control of the control part 103, contents information around a selected time is displayed in the display part 120 in a way that it can be selected as a plurality of contents images 150 arranged in a time sequence at a predetermined time interval. Thereby, desired contents information can be extracted extremely easily. Specifically, in the GUI of the present embodiment, under the control of the control part 103, with a vertical axis as a type axis of contents information and a horizontal axis as a time axis, a plurality of types of contents information around a time selected based on an operation signal are displayed on a display screen in a way that they can be selected as a plurality of contents images 150 arranged in a time sequence at a predetermined time interval in the direction of the time axis and on a type basis in the direction of the type axis. Thereby, desired contents information can be extracted extremely easily from the plurality of types of contents information. The contents images 150 are displayed on the display screen in units of small screens. Although, in FIG. 4, television channels are used as the type of contents information, genres or other types may be used.

In the GUI of the present embodiment, for each television channel, video information and EPG information are displayed in juxtaposition on the time axis in a way that they can be selected as contents images. Thereby, any of the video information and the EPG information can be selected while viewing the video information and the EPG information in a time sequence, so that usability is increased. Past contents information includes recorded video information and EPG information, current contents information includes currently broadcast video information and EPG information, and future contents information includes EPG information.

Figure 5A:
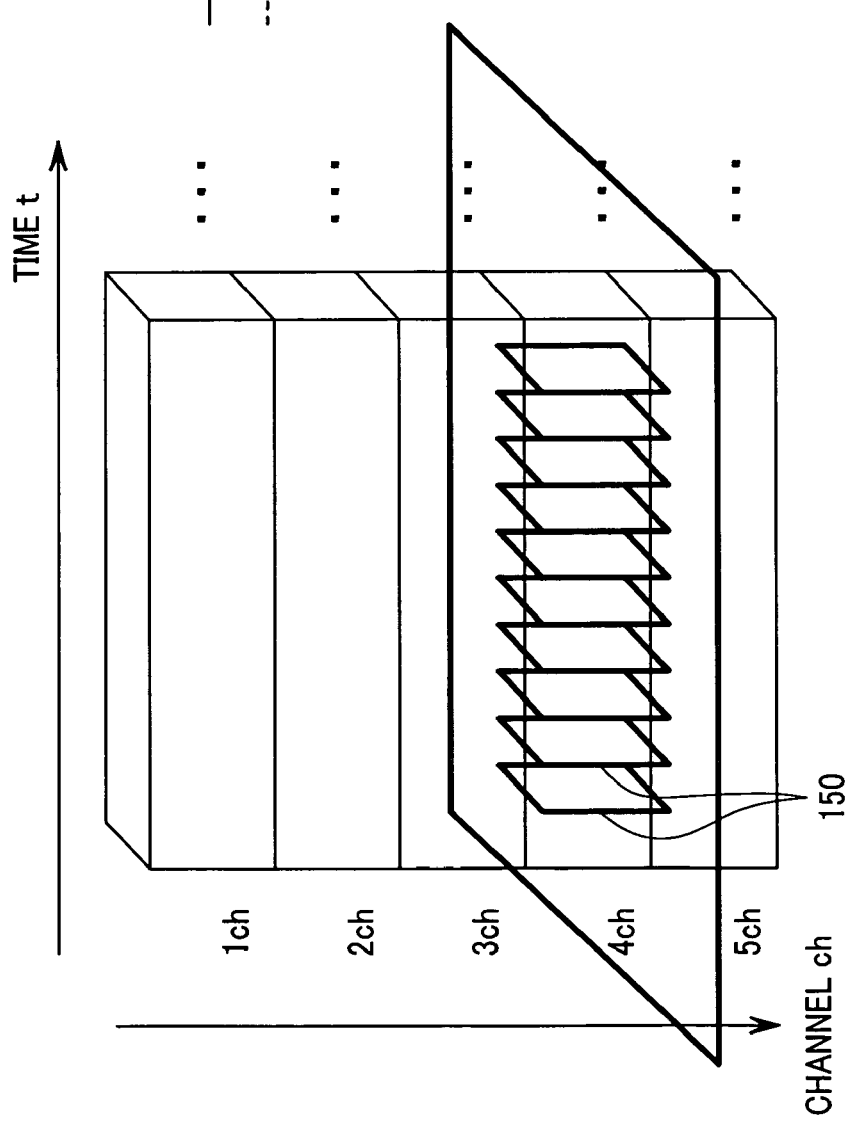
FIGS. 5A and 5B are conceptual diagrams for explaining segmentation at a selected time in the GUI of the present embodiment.
Figure 5B:
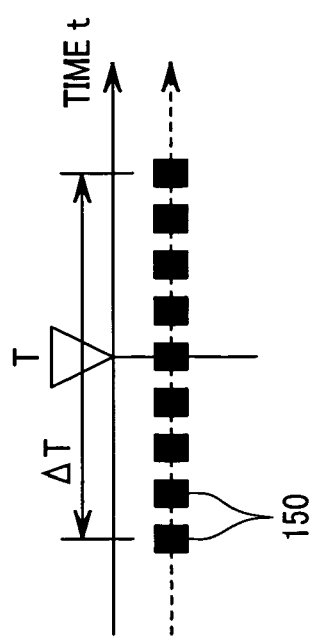

FIGS. 5A and 5B are conceptual diagrams for explaining segmentation at a selected time in the GUI of the present embodiment. In the GUI of the present embodiment, as illustrated in enlargement in the central portion of FIG. 5A, contents information around a time selected by an operation signal from the remote control 130 is set and handled as time-sequence contents images 150. In other words, in the GUI of the present embodiment, as shown in FIG. 5B, contents information in a neighboring time $\Delta T$ of a time T selected by an operation signal from the remote control 130 is set and handled as time-sequence contents images 150. The neighboring time $\Delta T$ can be easily changed by operating the time scale change dial 135 of the remote control 130. When the time scale change dial 135 is turned clockwise, the neighboring time $\Delta T$ is shortened. In other words, if the length of the time axis of the display screen and the size of the contents images 150 displayed are not changed, the time interval of the contents images 150 displayed is shortened. When the time scale change dial 135 is turned counterclockwise, the neighboring time $\Delta T$ is extended. That is, the time interval of the contents images 150 displayed is extended. In this way, by extending or shortening the time range of the contents images 150 displayed, a desired contents image 150 can be extracted more quickly.

FIGS. 6A, 6B, and 6C show display examples of basic operations by the GUI of the present embodiment. In the present embodiment, as shown in FIG. 6A, plurality of contents images 150 are displayed within small screens of the display screen. In FIG. 6A, an on-air image (video image) 151 at the current time is displayed on a central small screen, a video image 152 at a past time is displayed on a small screen to the left of it, and an EPG image 153 at a future time is displayed on a small screen to the right of it. The on-air image 151 at the current time is an on-air moving image on the air being broadcast, and the video image 152 at a past time is a static image already recorded. By this construction, by simply viewing these small screens at startup, the user can easily understand a time relation of the plurality of small screens, and quickly proceed to a next operation. Although, in the examples of the drawing, five small screens are shown to display the contents images 150, the number of the small screens may be greater or smaller than five.

When time reaches 3:00 p.m. in the state of FIG. 6A, the small screens each shift to the left as shown in FIG. 6B. Specifically, an on-air image 151 at the current time continues to be displayed as an on-air moving image on the central small screen, video images at 2:00 p.m. and 3:00 p.m. are displayed as static images on the small screens to the left, and EPG images 153 at 4:00 p.m. and 5:00 p.m. are displayed on the small screens to the right. Thus, even if time has elapsed, since an on-air image 151 at the current time continues to be displayed as an on-air moving image, a time relation of the plurality of small screens displayed can be easily grasped.

When a video image at a past time (e.g., a video image at 2:00 p.m.) is selected in the state of FIG. 6A, all the small screens shift to the right as shown in FIG. 6C, a selected video image at 2:00 p.m. is displayed as a static image on the central small screen, video images at 12:00 p.m. and 1:00 p.m. before the selected 2:00 p.m. are displayed as static images on the small screens to the left, and on the small screens to the right, an on-air image 151 at the current time which is the future of the selected time continues to be displayed and EPG information 153 at 3:00 p.m. which is the future of the current time is displayed. Thus, even if a small screen at a past time is selected, since a relation of a time sequence among the plurality of small screens is maintained, a time relation of the plurality of small screens displayed can be still easily grasped.

When a video image at 1:00 p.m. is selected in the state of FIG. 6A, although not shown, all the small screens shift to the right, a video image at 1:00 p.m. is displayed as a static image on the central small screen, video images at 11:00 a.m. and 12:00 p.m. which are past times of the selected 2:00 p.m. are displayed as static images on the small screens to the left, and on the small screens to the right, the video image at 2:00 p.m. which is a future to (previous to the current time) the selected time is displayed as a static image, and the on-air image 151 at the current time which is the future of 1:00 p.m. continues to be displayed as an on-air moving image.

When an EPG image at a future time (e.g., a video image at 3:00 p.m.) is selected in the state of FIG. 6A, although not shown, all the small screens shift to the left. On the small screens to the left, the on-air image 151 at the current time in the past of the selected time 3:00 p.m. continues to be displayed as an on-air moving image, and the video image at 2:00 p.m. previous to 2:00 pm is displayed as a static image, and on the small screens to the right, the EPG images 153 at 4:00 p.m. and 5:00 p.m. which is the future of the selected time are displayed. Thus, even if a small screen at a future time is selected, since a relation of a time sequence among the plurality of small screens is maintained, a time relation of the plurality of small screens displayed can be still easily grasped.

FIGS. 7A, 7B, and 7C show variations of display examples by the GUI of the present embodiment.

FIG. 7A shows the same state as those of FIGS. 6A, 6B, and 6C for comparison, and duplicate descriptions are omitted.

FIG. 7B enlarges a central small screen to display a selected contents image. By using such a screen structure, the selected contents image can be emphatically displayed at the center of the screen, and visibility can be increased. When the contents information selected and displayed at the center is a video, a moving image is displayed as a contents image. Thereby, a desired contents image can be more easily selected.

FIG. 7C shows a display example that displays an array of small screens of contents images of plurality of columns and plurality of rows with a central small screen as a selected screen, arranged in a time sequence from the leftmost small screen on the top row. Since contents images can be displayed in a wider range by using such a screen structure, a desired contents image can be more easily selected.

FIGS. 8A, 8B, 8C, and 8D are drawings for explaining examples of display with different time resolutions (in other words, a time interval at which contents images are arranged on a display screen) by the GUI of the present embodiment.

FIG. 8A is a drawing for explaining a display example of the finest resolution. In the present embodiment, contents images produced by resolving a video of contents information into 30 pieces in one second are used as the smallest frames, and the contents images are displayed as small screens on a display screen. Therefore, in the present embodiment, as shown in FIG. 8A, the contents images can be selected with a resolution increased up to 1/30th of a second.

FIG. 8B is a drawing for explaining an example of display in one-second resolution. When small screens are displayed with one-second resolution, as shown in FIG. 8B, small screens are displayed at intervals of 30 frames from an array of frames of the smallest unit.

FIG. 8C shows an example that displays small screens of one-minute resolution on a display screen. This display example is the same as those in FIGS. 6A, 6B, and 6C except the times and time intervals of display. Therefore, duplicate descriptions are omitted.

FIG. 8D shows an example that displays small screens of one-day resolution on a display screen. This display example is the same as those in FIGS. 6 and 8A except the times and time intervals of display. Duplicate descriptions are omitted.

FIGS. 9A, 9B, 9C, and 9D are drawings for explaining display examples of a dynamic reference mode by the GUI of the present embodiment.

For example, when 4:00 is selected in an hour mode, as shown in FIG. 9A, with a contents image at 4:00 centrally displayed, contents images at 2:00, 3:00, 4:00, 5:00, and 6:00 are displayed on a display screen. In this state, when a minute mode is selected by the time scale change dial 135 of the remote control 130, as shown in FIG. 9B, with the contents image at 4:00 centrally displayed, contents images at exactly 3:58, 3:59, 4:00, 4:01, and 4:02 are displayed. In this state, when the contents images are moved by the horizontal movement keys 132 of the remote control to select a contents image at time 4:14, as shown in FIG. 9C, with the contents image at 4:14 centrally displayed, contents images at exactly 4:12, 4:13, 4:14, 4:15, and 4:16 are displayed. In this state, when the hour mode is selected by the time scale change dial 135 of the remote control 130, the central contents image is switched to a moving image displayed beginning at 4:14. In this way, by performing searching using the dynamic reference modes, a desired contents image can be easily extracted in a short time.

When 4:00 is selected in the hour mode in FIG. 9A, a selected contents image may be displayed as a moving image, and in this case, when switching is made to the minute mode as shown in FIG. 9B a predetermined elapsed time after 4:00 is selected, the switching is performed so that a contents image after the predetermined time has elapsed is centrally displayed. For example, when switching is made to the minute mode in FIG. 9B 23 minutes after 4:00 is selected in the hour mode in FIG. 9A, with the contents image at 4:23 centrally displayed, contents images at 4:21, 4:22, 4:23, 4:24, and 4:25 are displayed. As described above, when a time scale is changed, images corresponding to elapsed time of contents images selected before the change are displayed as contents images selected in a scale after the change. Thereby, since the display of contents images remains unchanged before and after the change of a time scale (moving images are continuously reproduced), the contents images can be switched without a sense of incongruity.

Figure 10B:
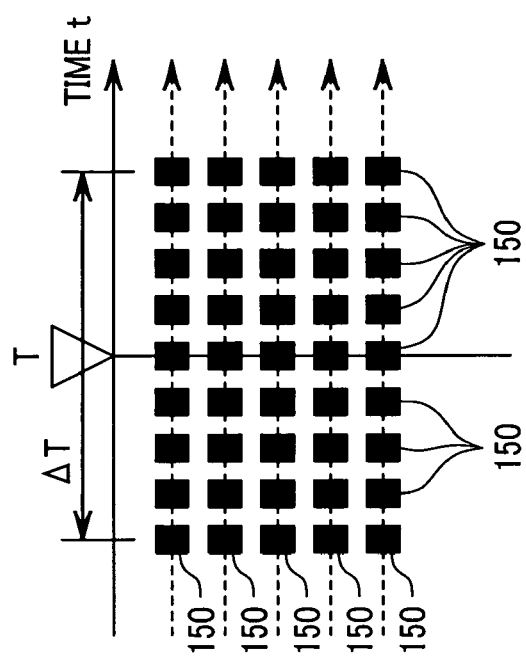
FIGS. 10A and 10B are conceptual diagrams for explaining the segmentation of a plurality of types of contents information at a selected time in the GUI of the present embodiment.
Figure 10A:
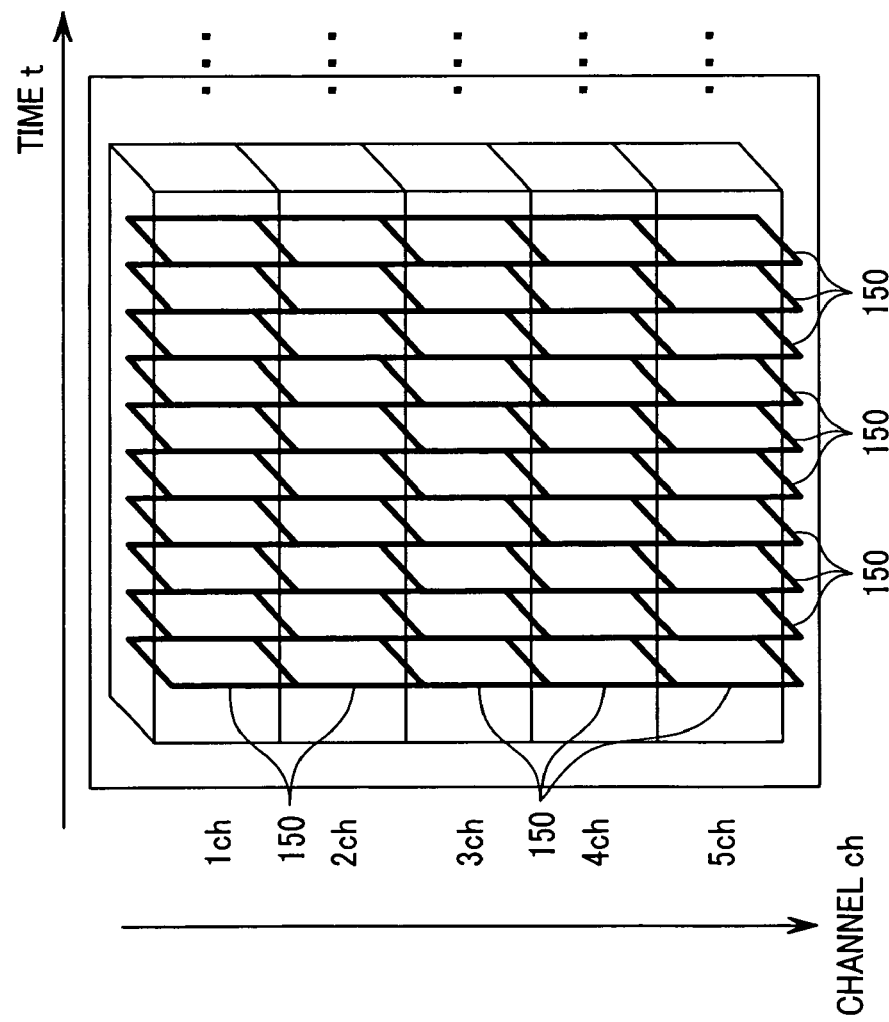

FIGS. 10A and 10B are conceptual diagrams for explaining the segmentation of plurality of types of contents information at a selected time in the GUI of the present embodiment. The case of FIGS. 10A, 10B, 10C, and 10D is different from the case of FIGS. 5A and 5B in that plurality of types of contents information (plurality of channels of contents information in the example of the drawing) are segmented as plurality of rows of contents information, and is the same as the case of FIGS. 5A and 5B in the segmentation of contents information of each row. Contents images of channels of FIGS. 10A, 10B, 10C, and 10D are handled in conjunction with one another; when a certain contents image is selected in a certain channel, contents images of other channels change correspondingly. Thereby, plurality of rows of contents images can be always viewed in a predetermined time sequence relation, so that a desired contents image can be easily extracted.

FIGS. 11A and 11B show an example of displaying plurality of channels of contents images in the present embodiment on a display screen in plurality of rows. FIG. 11A shows an example of a screen on which plurality of channels of contents images are displayed in plurality of rows, and FIG. 11B shows an example of switching from the screen of FIG. 11A to the screen on which plurality of categories of contents information are displayed in plurality of rows. The screen of FIG. 11B can also be switched to the screen of FIG. 11A.

Figure 12:
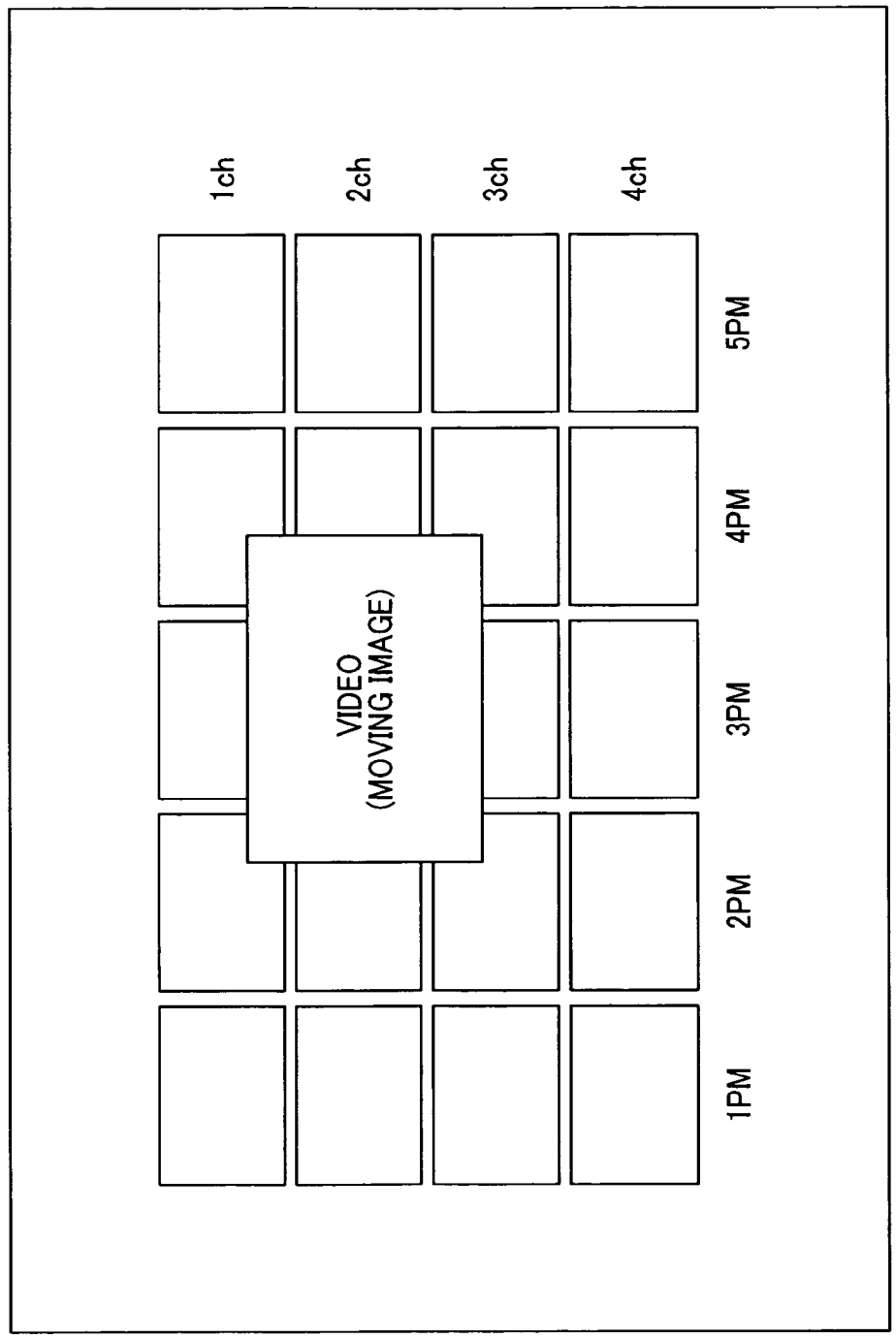
FIG. 12 is a drawing for explaining an example in which a selective image in the GUI of the present embodiment is enlarged and displayed as a moving image.

FIG. 12 is a drawing for explaining an example in which a selective image in the GUI of the present embodiment is enlarged and displayed as a moving image. In the present embodiment, in the example of displaying plurality of channels of contents images on a display screen in plurality of rows as described in FIG. 11A, when a cursor is set on a certain channel at a certain time (3:00 p.m. in channel 2 in the example of the drawing), a contents image indicated by the cursor is enlarged and displayed as preview moving images repeated from 3:00 p.m. to 4:00 p.m. Thereby, a desired contents image can be extracted more easily. The length of reproduction time of the preview moving images is adjustable by changing the time modes.

In the present embodiment, when an up-down operation is performed on the channels, the channels move up or down, and when a horizontal movement operation is performed on the cursor, the cursor is unchanged in horizontal position, and the whole screen moves horizontally. Immediately after the movement, the reproduction of preview moving images is started.

Furthermore, in the present embodiment, when a preview screen which is a selective screen is decided, the screen is fully displayed and the reproduction continues until a halt command is issued. Thereby, extracted contents images can be easily viewed.

As has been described above, according to the present embodiment, under the control of the control part 103, contents information around a selected time is displayed in the display part 120 in a way that it can be selected as plurality of contents images arranged in a time sequence at a predetermined time interval. Therefore, desired contents information can be extracted easily.

What is claimed is:

1. A contents information display device comprising:
an information receiving part that receives contents information;
a recording part that records the received contents information;
a display part that displays the contents information;
an input part that inputs an operation signal;
a control part that controls the information receiving part, the recording part, the display part and the input part,
wherein the contents information includes video information and electronic program guide information,
wherein the recording part includes a recorded video information database in which the video information is stored and an electronic program guide information database in which the electronic program guide information is stored,
wherein the control part performs control such that the video information around a selected time in the video information stored the recorded video information database is displayed at the same time on a display screen of the display part as a plurality of small screen contents images arranged in a time sequence at a predetermined time interval and wherein any of the plurality of small screen contents images can be selected,
wherein the control part performs control such that the time interval is changed based on an operation signal for changing the time interval that is sent from the input part, wherein the video information of the time interval after the change is set in a time sequence as contents images and is displayed at the same time on the display screen as small screen contents images at the time interval after the change and wherein any of the small screen contents images after the change can be selected, and
wherein the content images are content images or thumbnail pictures representing a moving picture data or a video steam of a broadcast content.

2. The contents information display device according to claim 1,
wherein the plurality of contents images are predetermined static images or moving images beginning at a display time of the contents images decided from the selected time and the predetermined time interval.

3. The contents information display device according to claim 1,
wherein, in a direction orthogonal to a direction in which the plurality of contents images is arranged, a plurality of channels or categories of contents images are displayed in juxtaposition.

4. The contents information display device according to claim 1,
wherein a selective image window in which contents images selected from the plurality of contents images are displayed is further displayed, and the selective image window displays moving images.

5. The contents information display device according to claim 1,
wherein, the control part performs control such that the predetermined time interval can be changed and contents images selected before the change are displayed as contents images selected in the time interval after the change.

6. The contents information display device according to claim 1,
wherein, video information read from the recorded video information database is displayed as the contents images from a time earlier than the current time, and electronic program guide information read from the electronic program guide information database is displayed as the contents images from a time later than the current time.

7. The contents information display device according to claim 6,
wherein the contents images from a time earlier than the current time are displayed as static images of video information read from the recorded video information database, the contents image at the current time is displayed as an on-air moving image of an on-air image at the current time, the contents images from a time later than the current time are displayed as the electronic program guide information read from the electronic program guide information database.

8. The contents information display device according to claim 7,
wherein, when the plurality of contents images are displayed in a way that the plurality of contents images move in a time change direction while keeping a time relationship between the plurality of contents images by elapsed time or selection of any of the plurality of contents images, an on-air image at the current time continues to be displayed as an on-air moving image.

9. The contents information display device according to claim 1,
wherein the plurality of small screen contents images are displayed in a way that they move in a time elapse direction of a horizontal axis while keeping a time relationship between the small screen contents images as time elapses.

10. The contents information display device according to claim 1,
wherein a time interval change area for changing the time interval is displayed.

11. The contents information display device according to claim 1,
wherein, the contents information includes a plurality of types of contents information,
the plurality of types of contents information include a plurality of small screen contents images arranged in a time sequence at a predetermined time interval in each of the types of contents information,
the plurality of small screen contents images are displayed at the same time and in a plurality of rows in each of the types of contents information on the display screen, and
wherein any of the plurality of small screen contents images can be selected,
wherein, when a certain small screen contents image is selected in a certain channel, the small screen contents images of other types of contents information change corresponding to the small screen contents image selected and the small screen contents images in the plurality of rows are displayed while keeping a predetermined time sequence relation.

12. The contents information display device according to claim 1,
wherein an on-air image at the current time, which is one of the plurality of contents images displayed at the same time on the display screen, is displayed as a moving image.

13. The contents information display device according to claim 1,
wherein a selected contents image, which is one of the plurality of contents images displayed at the same time on the display screen, is displayed as a moving image.

14. A contents information display device comprising:
a plurality of information receiving parts that receive a plurality of types of contents information at the same time;
a recording part that records the plurality of types of contents information received at the same time in the plurality of information receiving parts;
a display part that displays the plurality of types of contents information recorded in the recording part at the same time on a display screen as contents images;
an input part that inputs an operation signal;
a control part that controls the plurality of information receiving parts, the recording part, the display part and the input part,
wherein the contents information includes video information and electronic program guide information,
wherein the recording part includes a recorded video information database in which the video information is stored and an electronic program guide information database in which the electronic program guide information is stored,
wherein the control part performs control such that the plurality of types of video information around a time selected based on the operation signal in the video information stored the recorded video information database is displayed at the same time on the display screen with one of vertical and horizontal axes as a type axis of the contents information and the other as a time axis as a plurality of small screen contents images arranged in a time sequence at a predetermined time interval in a direction of the time axis and on a type basis in a direction of the type axis and wherein any of the plurality of small screen contents images can be selected,
wherein the control part performs control such that the time interval is changed based on an operation signal for changing the time interval that is sent from the input part, wherein the contents information of the time interval after the change is set in a time sequence as contents images and is displayed at the same time on the display screen as small screen contents images at the time interval after the change and wherein any of the small screen contents images after the change can be selected, and
wherein the content images are content images or thumbnail pictures representing a moving picture data or a video stream of a broadcast content.

15. A recording/reproducing device comprising:
an information receiving part that receives contents information;
a recording part that records received contents information;
an input part that inputs an operation signal;
a control part that controls the information receiving part, the recording part and the input part,
wherein the contents information includes video information and electronic program guide information,
wherein the recording part includes a recorded video information database in which the video information is stored and an electronic program guide information database in which the electronic program guide information is stored,
wherein the control part performs output so that the video information around a selected time in the video information stored in the recorded video information database is displayed at the same time on a display screen of the display part such that it can be selected as a plurality of small screen contents images arranged in a time sequence at a predetermined time interval, wherein the control part performs control such that the time interval is changed based on an operation signal for changing the time interval that is sent from the input part, the video information of the time interval after the change is set in a time sequence as contents images and is displayed at the same time on the display screen as small screen contents images at the time interval after the change and wherein any of the small screen contents images after the change can be selected, and wherein the content images are content images or thumbnail pictures representing a moving picture data or a video stream of a broadcast content.

* * * * *